May 28, 1935.  E. W. LARSEN  2,002,699
CLUTCH
Filed Jan. 13, 1933
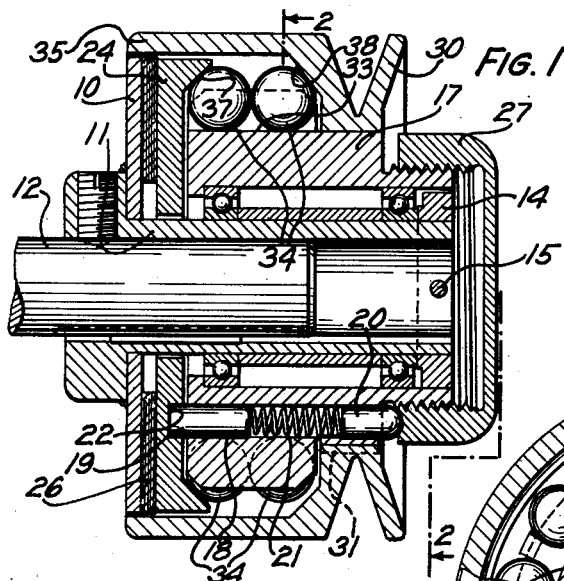
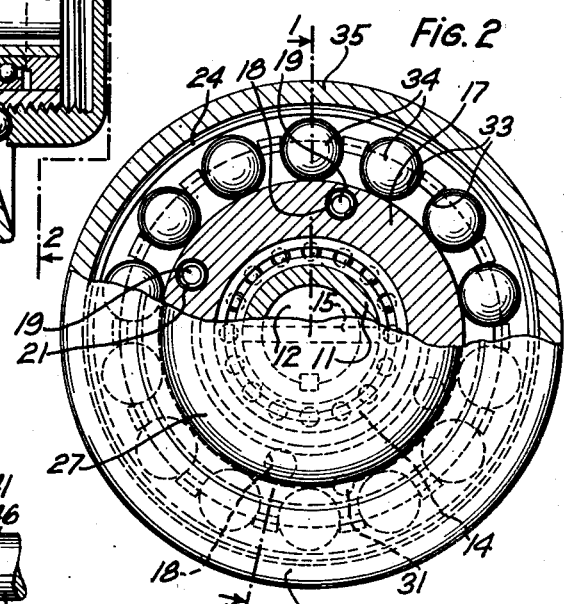
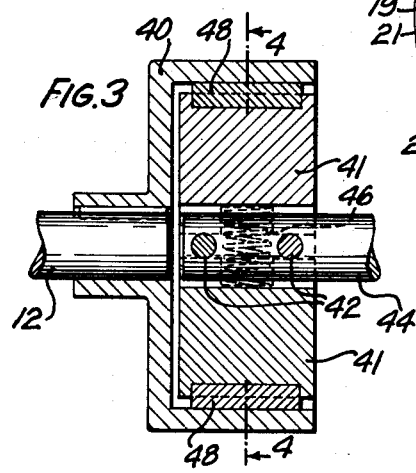
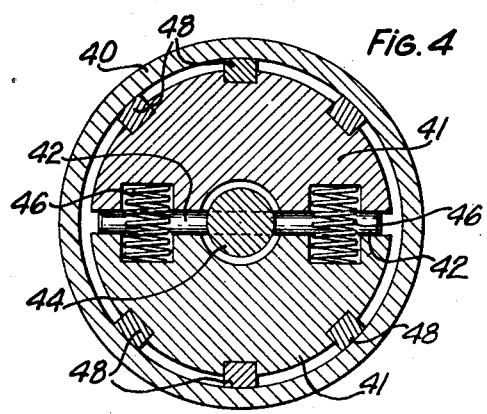
INVENTOR
E. W. LARSEN
BY H. A. Whitehorn
ATTORNEY Patented May 28, 1935

2,002,699

UNITED STATES PATENT OFFICE 2,002,699

CLUTCH

Einer W. Larsen, Chicago, Ill., assignor to Western Electric Company, Incorporated, New York, N. Y., a corporation of New York Application January 13, 1933, Serial No. 651,483

4 Claims. (Cl. 192—103)

This invention relates to clutches and more particularly to friction clutches, and its principal object is to provide a clutch which is of simple and inexpensive construction and efficient in its operation.

One embodiment of the invention contemplates a friction clutch in which centrifugally actuated means is responsive to an increasing speed of the driven member for increasing the torque applied thereto by the driving member. A preferred form of clutch embodying the invention comprises driving and driven members having cooperating friction surfaces, yielding means for forcing said surfaces into frictional driving engagement, and centrifugally actuated means carried by the driven member and responsive to an increasing speed thereof for forcing the driving and driven members into a more positive driving engagement. The yielding means is preferably adjustable to permit, within wide limits, an adjustable acceleration of the driven member.

Other features and advantages of the invention will become apparent from the following detailed description when read in conjunction with the accompanying drawing, in which Fig. 1 is an axial sectional view of a preferred form of clutch embodying the features of the invention, taken on line 1—1 of Fig. 2;

Fig. 2 is a vertical section on line 2—2 of Fig. 1;

Fig. 3 is an axial sectional view of an alternative form of clutch embodying the invention, and Fig. 4 is a vertical section on line 4—4 of Fig. 3.

In the preferred construction of the clutch, as shown in Figs. 1 and 2, a driving friction member 10 is welded or otherwise secured to one end of a sleeve 11 adapted to be fixed to a driving or motor shaft 12 so as to be rotatable therewith. The opposite end of the sleeve 11 extends beyond the end of the motor shaft and has a collar 14 fixed thereto by means of a pin 15. Rotatably supported upon the driving sleeve 11, but restrained from moving longitudinally thereof, is a driven clutch member 17 in the form of a sleeve having a plurality of circumferentially spaced longitudinally extending apertures 18, in each of which is slidably fitted a pair of pins 19 and 20 normally urged in opposite directions by a coil spring 21. The outer ends of the pins 19 fit into circular recesses 22 of a driven friction member 24 which is loose on the driving sleeve 11 and is disposed adjacent to the driving friction disk 10, the usual friction disc 26 being interposed between the driving and driven friction members.

The outer ends of the pins 20 engage a nut 27, in the form of a cap, threaded to a reduced end portion of the driven sleeve 17.

From the above description, it will be understood that the driven clutch sleeve 17 rotates with the driven friction member 24, being interlocked therewith by the pins 19 under the tension of the springs 21. It will also be apparent that the springs 21 also serve to hold the driven friction member 24 in yielding driving engagement with the driving friction member 10, the pressure of the driving engagement being adjustable by turning the nut 27 and thereby adjusting the tension of the springs 21.

A pulley 30 is fixed to the driven sleeve 17, intermediate its ends, by means of a pin 31. The end portion of the driven sleeve 17 between the pulley 30 and the driven friction member 24 is of larger diameter than the intermediate portion of the sleeve and is formed on its periphery with a plurality of equally spaced longitudinally extending grooves 33, and fitting loosely in each of these grooves is a pair of steel balls 34. The steel balls are held in the grooves by a cylindrical housing 35 formed integral with the pulley 30 and extending to the outer face of the driving friction member 10, the inside diameter of the housing being slightly larger than the diameter of the driving member. It will be noted that the inner wall of the housing 35 is spaced from the bottom of the grooves 33 sufficiently to permit the steel balls 34 to move radially outwardly a limited amount. The driven friction member 24 and the pulley 30, which rotates therewith, are provided on their opposed inner faces with inclined surfaces 37 and 38, respectively, and the balls 34, when moved outwardly, engage these inclined surfaces, and thereby force the driven friction member into a more positive driving engagement with the driving friction member 10.

The operation of the above described clutch is as follows: The driving shaft 12 together with the driving friction member 10 are driven by direct connection with an electric motor or by other suitable means (not shown). A predetermined starting torque is applied to the driven friction member 24 through its yielding engagement with the driving friction member under the pressure of the springs 21. Upon rotation of the driven friction member together with the ball carrying sleeve 17 and pulley 30, the balls 34 are thrown outwardly by centrifugal force against the inclined surfaces 37 and 38, thereby forcing the driven member 24 into a more positive engagement with the driving member 10. The centrifugal force tending to throw the balls 34 outwardly increases with increasing speeds of the ball carrying sleeve 17 which rotates with the driven member and the pulley, and therefore, the torque applied to the driven member increases with increasing speeds of the pulley or other driven parts of the clutch. In other words, as the speed of the driven part of the clutch increases, it is forced into a more positive driving engagement with the driving part of the clutch by the centrifugally actuated balls 34 in the manner described above. Thus, the driven member is accelerated to maximum speed at a rate depending upon the initial or starting torque applied thereto, which may be varied, within wide limits, by simply changing the tension of the springs 21 by means of the adjusting nut 27. For example, if a slow acceleration of the driven member is desired, the springs 21 are adjusted so that a correspondingly low starting torque is applied to the driven member. When a faster acceleration of the driven member is desired, the starting torque applied thereto, is correspondingly increased.

By employing a pair of balls 34 in each of the grooves 33 of the driven sleeve 17, as shown in the embodiment illustrated in Figs. 1 and 2, there is set up in the movement of the balls outwardly under the action of centrifugal force a positive radial rolling motion between the balls themselves, as well as a similar motion of the balls upon the inclined surfaces 37 and 38. With this arrangement there is eliminated the spasmodic effect encountered in static friction and consequently a very smooth acceleration is provided. In addition, due to the radial rolling motion of the balls, wear upon the balls 34 and the surfaces 37 and 38 is reduced to a minimum.

In an alternative form of clutch embodying the invention, shown in Figs. 3 and 4, a cup shaped driving member 40 is secured to the driving or motor shaft 12, and the driven member of the clutch comprises complementary semi-circular portions 41 fitting within the driving member 40 and capable of radial movement therein. By means of a pair of driving pins 42, the driven member of the clutch is coupled to a shaft 44 to be driven thereby. As shown in Fig. 4, the pins 42 extend laterally through the driven shaft 44 and between the semi-circular portions 41 of the driven clutch member. The portions 41 are yieldably held in engagement with the driving member 40 by a pair of springs 46 interposed between the portions 41. In order to secure a high coefficient of friction, inserts 48 of wood or other suitable material are preferably provided in the driven portions 41 for engagement with the driving clutch member 40.

This form of clutch operates similarly to the one shown in Figs. 1 and 2 and described above. The springs 46 provide sufficient pressure between the driving and driven members to start rotation of the driven member, after which the driven members 41 are moved outwardly by centrifugal force into a more positive driving engagement with the driving member 40.

Clutches embodying the features of the present invention may be employed to advantage in coil winding machines, wherein it is essential that the winding spindle be slowly accelerated to its maximum speed in order to prevent wire breakages. By this form of clutch, the required slow acceleration is obtained without the use of the usual flywheel, and thus the problem of providing a practical and efficient means for quickly stopping the winding spindle is simplified considerably. Furthermore, when this type of clutch is used with a split phase driving motor, it permits the driving motor to pick up its load gradually so that it can come up to speed and cut out its starting winding before the full load is imposed thereon.

It is to be understood that the invention is not limited to the particular constructions and embodiments thereof herein illustrated and described except insofar as is defined by the appended claims.

What is claimed is:

1. A clutch comprising driving and driven members normally in yieldable frictional driving engagement, said driven member including an element slidable towards said driving member to effect a driving engagement between said members and an axially fixed element having axially extending grooves on its periphery, said elements having spaced opposed inclined surfaces, and a plurality of pairs of balls movable radially by centrifugal force in said grooves and having rolling engagement with each other and with the inclined surfaces during their radial movement in response to an increasing speed of said driven member for forcing said members into a more positive driving engagement.

2. A clutch comprising a driving member, a pair of driven members having inclined surfaces, said driving member and one of said driven members having cooperating friction surfaces, means for effecting an initial driving engagement between said friction surfaces, and a plurality of pairs of balls movable radially by centrifugal force and having rolling engagement with said inclined surfaces during their radial movement in response to an increasing speed of said driven member for forcing said friction surfaces into more positive driving engagement.

3. A clutch comprising a driving member, a pair of driven members having inclined surfaces, said driving member and one of said driven members having cooperating friction surfaces, a plurality of pairs of balls movable radially by centrifugal force and having rolling engagement with said inclined surfaces during their radial movement in response to an increasing speed of said driven member for forcing said friction surfaces into more positive driving engagement, and resilient means for normally urging the friction surface of said driven member into engagement with the friction surface of said driving member.

4. A clutch comprising a driving member, a pair of driven members having inclined surfaces, said driving member and one of said driven members having cooperating friction surfaces, means for effecting an initial driving engagement between said friction surfaces, a plurality of pairs of balls movable radially by centrifugal force and having rolling engagement with said inclined surfaces during their radial movement in response to an increasing speed of said driven member for forcing said friction surfaces into more positive driving engagement, and means for maintaining said balls in predetermined circumferential relation between the inclined surfaces.

EINER W. LARSEN.